United States Patent [19]

Harlan et al.

[11] Patent Number: 5,089,994

[45] Date of Patent: Feb. 18, 1992

[54] TOMOGRAPHIC ESTIMATION OF SEISMIC TRANSMISSION VELOCITIES FROM CONSTANT OFFSET DEPTH MIGRATIONS

[75] Inventors: Wiliam S. Harlan; Douglas W. Hanson; Shein-Shion Wang, all of Ponca City, Okla.

[73] Assignee: Conoco Inc., Ponca City, Okla.

[21] Appl. No.: 656,546

[22] Filed: Feb. 14, 1991

[51] Int. Cl.$^5$ .......................... G01V 1/28; G01V 1/36

[52] U.S. Cl. ........................................ 367/73; 367/50; 367/53

[58] Field of Search .................... 364/421; 367/50, 51, 367/53, 73

[56] References Cited

U.S. PATENT DOCUMENTS

| | | | |
|---|---|---|---|
| 4,330,872 | 5/1982 | Bratton | 367/43 |
| 4,839,869 | 6/1989 | Corcoran | 367/53 |
| 4,964,088 | 10/1990 | Chittneni | 367/51 |

OTHER PUBLICATIONS

Numerical Recipes, Press et al., 1986–"Two Point Boundary Value Problems".
Vidale, John E. "Finite–Difference Calculation of Traveltimes in 3–D", University of California at Santa Cruz.
Moser, T. J., "Efficient Seismic Ray Tracing Using Graph Theory," University of Utrecht, Netherlands.
"Velocity Analysis Using Prestack Depth Migration: Applying the Linear Theory," Etgen, J. T., Stanford U.
"Velocity Analysis Using Prestack Depth Migration: Linear Theory," Etgen, J. T., Stanford U. 1989.

Primary Examiner—Ian J. Lobo

[57] ABSTRACT

A method for improving velocity models so that constant-offset migrations estimate consistent positions for reflectors includes tomographic estimation of seismic transmission velocities from constant-offset depth migrations. A method of converting inconsistencies in reflector positioning from constant-offset migrations into equivalent errors in modeled travel times is introduced, so that conventional methods of traveltime tomography can improve the velocity model. An improved velocity model allows a more accurate migrated image of the subsurface. The estimated velocity model can also detect anomalous regions of geologic significance, such as low velocity gas accumulations and irregular near surface weathering. In an alternate embodiment the procedure can be iterative and allow alternating improvements in the positions of reflectors and in the velocity model.

5 Claims, 3 Drawing Sheets

TOMOGRAPHIC ESTIMATION OF SEISMIC TRANSMISSION VELOCITIES FROM CONSTANT OFFSET DEPTH MIGRATIONS

BACKGROUND OF THE INVENTION

1. Field of the Invention

The present invention relates to a method for the estimation of seismic velocities and more particularly to a method for the tomographic estimation of seismic transmission velocities.

2. Related Prior Art

Depth migration can estimate the locations of seismic reflectors in the earth from surface reflection seismic data. Migration requires a model of how seismic velocities change in the earth. However, these quantities cannot be measured directly. If the velocity model is incorrect, then migration will locate reflectors incorrectly.

Depth migration can also create images of seismic reflectors in the earth from single constant-offset seismic gathers, that is, from pairs of sources and receivers with equal horizontal separation. Since different offsets measure different angles of reflection, we can expect some differences in the amplitudes and phase of migrated reflectors from different offsets. The positions of migrated reflectors should, however, be consistent over offset if the model truly represents the local seismic velocities of recorded waves.

Much of the prior art demonstrates the feasibility of traveltime tomography, and the difficulty of optimizing velocities directly from migrated images. Traveltime tomography assumes that traveltimes have been measured along previously estimated raypaths with known endpoints. Well known algorithms then adjust the velocities along these overlapping raypaths to reduce errors in the modeled traveltimes. Because raypaths have locally minimum traveltimes, these adjustments to velocities can correct traveltime errors to first order without adjusting the positions of raypaths. The improved velocity model leads to an improved estimate of the raypaths, and vice-versa.

Reflected raypaths require the iterative estimation of an additional unknown, the positions at which raypaths reflect. Once these reflection points are known, then conventional means of traveltime tomography can estimate the velocities and intervening raypaths. Similarly, improved velocities allow improved estimates of the positions of reflectors.

Previous methods of estimating velocities from migrated data have not attempted to use traveltime tomography directly on migrated data. Some approaches have used migrations to locate reflectors and have then used the original unmigrated data to pick traveltimes. Others have attempted to measure the effect of perturbed velocities directly on the positions of migrated reflectors, thus losing the simple, well understood traveltime techniques available.

Examples of methods by which prior art has illustrated ways of estimating transmission velocities are as follows.

In the publication *Numerical Recipes*, Press et al, 1986, Cambridge Univ. Press, Chapter 16, "Two Point Boundary Value Problems", discusses numerical shooting and relaxation methods.

The publication by Society of Exploration Geophysicists expanded abstracts from the 1989 International Meeting and Exposition included an article titled "Efficient Seismic Tracing Using Graph Theory" by T. J. Moser. This article discussed a method which proposed that the shortest path method is an efficient, accurate and flexible way to compute raypaths. Not only rays corresponding to first arrivals can be found, but also reflections on interfaces and other later arrivals. The method can be generalized and then applied to a much wider class of problems, like modeling of non-point sources, exploding reflectors and migration of traveltime data. Other graphtheoretical algorithms, like the second shortest path procedure and the re-optimization of shortest paths, have practical applications in seismic technology.

Society of Exploration Geophysicists expanded abstracts from the 1989 International Meeting and Exposition, also included an article by John E. Vidale titled "Finite-Difference Calculation of Traveltimes in 3-D". This article stated that the travel times of first arriving seismic rays through most velocity structures can be rapidly, computed on a three-dimensional numerical grid by finite-difference extrapolation. Head waves are properly treated and shadow zones are filled by the appropriate diffractions. Differences of less than 0.11 percent were found between the results of this technique and ray-tracing for a complex model. This scheme has proven useful for earthquake location, and shows promise as an inexpensive, well-behaved substitute for ray-tracing in forward-modeling and Kirchhoff inversion applications.

U.S. Pat. No. 4,330,872, "Common-Offset-Distance Seismic Trace Filtering", issued to Robert H. Bratton relates to a multiple coverage seismic exploration technique providing for a plurality of seismic trace recordings along a line of exploration. From these recordings, sets of common-offset-distance traces are gathered. Initial estimates are made of the apparent dips associated with the seismic reflection signals across each set of common-offset-distance traces. These initial dip estimates are smoothed and the sets of common-offset-distance traces filtered along the apparent dips associated with the smoothed dip estimates to enhance the signal-to-noise ratio of the primary reflection signals.

U.S. Pat. No. 4,839,869, "Methods for Processing Converted Wave Seismic Data", issued to Chris T. Corcoran relates to methods for processing converted wave seismic data which includes, fractional point gathering of the data in a manner consistent with a selected velocity model, dynamic correction of the data using parameters measured from the data to account for the asymmetric travel path of the converted wave rays and stacking the dynamically corrected data. Methods are also provided for updating the velocity model.

SUMMARY OF THE INVENTION

The present invention improves the velocity model so that constant-offset migrations estimate consistent positions for reflectors. A velocity model that produces consistent images is assumed to be more physically meaningful than one that does not. Moreover, the procedure can be iterative and allow alternating improvements in the positions of reflectors and in the velocity model.

The present invention introduces a method of converting inconsistencies in reflector positioning from constant-offset migrations into equivalent errors in modeled traveltimes, so that conventional methods of traveltime tomography can improve the velocity model. An improved velocity model allows a more accurate migrated image of the subsurface. The estimated velocity model can also detect anomalous regions of geologic significance, such as low velocity gas accumulations and irregular near-surface weathering.

The present invention provides a method for tomographic estimation of seismic transmission velocities which includes the following steps. First, seismic data are received. From this data an interval velocity model is constructed. Common offset gathers are migrated in depth and images of reflectors are created from each gather. Segments of migrated constant-offset reflectors in depth z and over horizontal position x for a predetermined number of offsets are then digitized. During digitization, each segment is assigned an index, to distinguish different continuous reflectors. The dip dz/dx is calculated at each point. Zero offset depth and dip are extrapolated for each horizontal position and for each continuous reflector. The point on the dipping migrated segment which lies closest to the zero offset image point is determined for each line in the list. Source and receiver positions are located on the surface for each reflection point. The surface positions and the total traveltime t of the up and down going rays are retained. The listed travel times are equated to unmigrated multi-offset traveltimes in the original data. The velocity model is improved so that travel times along "correct" raypaths best resemble the listed values.

DESCRIPTION OF THE PREFERRED EMBODIMENT

Figure 1:
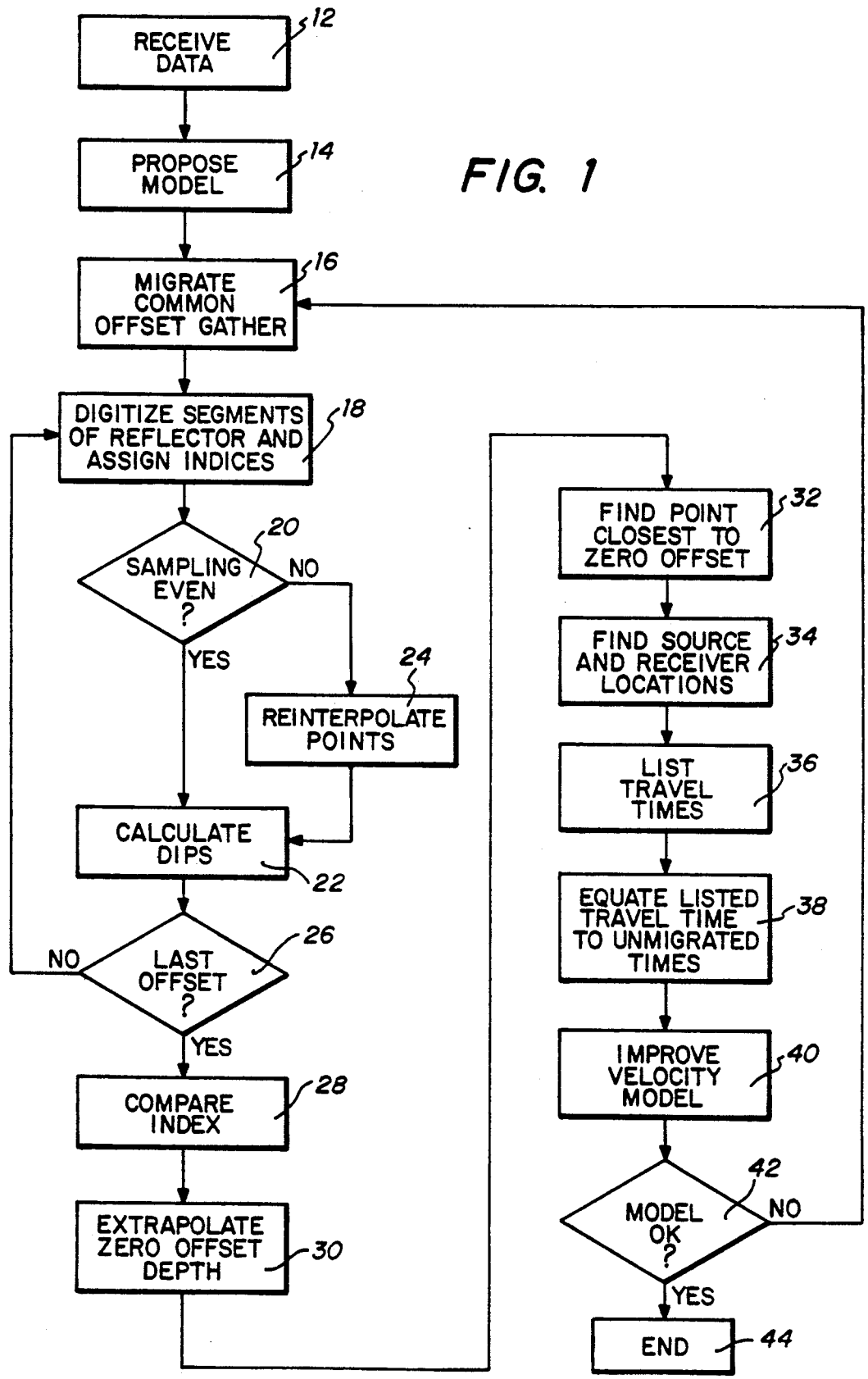
FIG. 1 is a block diagram of a flow chart of the method of the present invention.

The present invention provides a method that uses tomographic estimation of seismic transmission velocities which includes an iterative optimization of depth migration velocities. Referring now to FIG. 1, the method of the present invention is illustrated as a flow chart in block form.

At block 12 seismic data are received. At block 14 an interval velocity model is constructed by any conventional means, such as stacking velocity analysis, etc.

At block 16 common offset gathers are migrated in depth and images of reflectors are created from each gather. The positions of these reflectors would be consistent over offset if velocities were perfect. However, since the velocities are an approximation and are never perfect, inconsistencies in the positions of the reflectors will exist.

Figure 2:
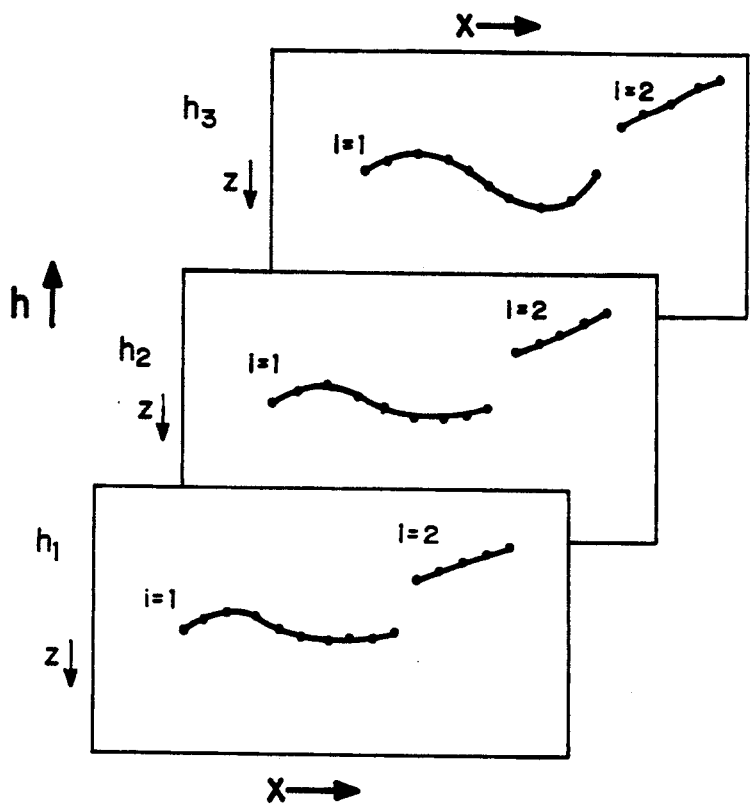
FIG. 2 is a graphical representation of digitized segments of migrated constant-offset reflectors at different offsets.

At block 18 segments of migrated constant-offset reflectors in depth z and over horizontal position x are digitized. During digitization, each segment is assigned an index i by the person performing the digitization, to distinguish different continuous reflectors. Each point (x and z) of a single continuous segment is assigned the same index i. Points from different segments on the same offset gather are assigned different indices if the segments do not join continuously. Points from different offset gathers are assigned the same index if and only if the corresponding segments join continuously over offset. This is illustrated in FIG. 2. The segments should be as continuous as possible but need not reach entirely across the common-offset gathers. Whether the digitized reflection points ($x_r$, $z_r$) provide an even and dense sampling over x is determined at block 20. If they are, the dip dz/dx is calculated at each point at block 22. If they are not, the program proceeds to block 24 where the digitized reflection points are re-interpolated to provide an even and dense sampling over x.

At block 26 a determination is made whether the last of a predetermined number of offsets has been reached. The same segment of each reflector is digitized for several different offsets h. Any number of offsets may be used as long as the indices may be compared at block 28. In the preferred embodiment the output contains a list of five values for each reflection point, with a different index i for each segment:

i, $x_r$, $z_r$, dz/dx, h
i, $x_r$, $z_r$, dz/dx, h ...

If lines of the list share the same i, then they are assumed to have derived from the same continuous physical reflector, although from different points along this reflector.

Figure 3:
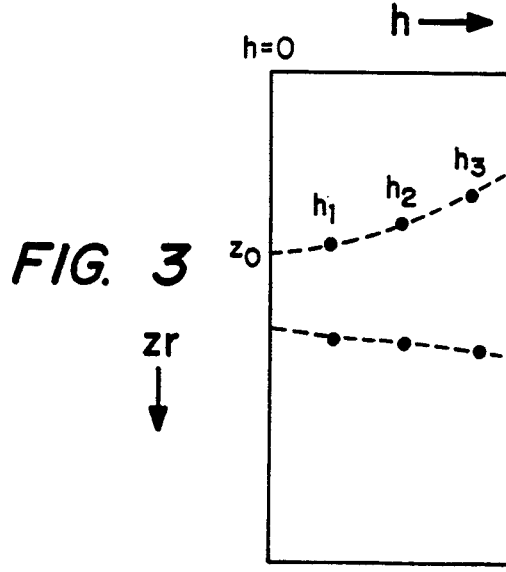
FIG. 3 is a graphical representation of extrapolated zero offset depth using different offsets.

At block 30 it is assumed that the zero offset migrated image is correct. For each i and $x_r$, a zero offset depth $z_0$ are extrapolated from available pairs of $z_r$ and h. FIG. 3 is a graphical representation illustrating zero offset extrapolations. A simple curve such as a hyperbola or parabola is fitted to these pairs and the zero offset intercept is calculated. The list now contains:

i, $x_r$, $z_0$, $z_r$, dz/dx, h
i, $x_r$, $z_0$, $z_r$, dz/dx, h ...

Figure 4:
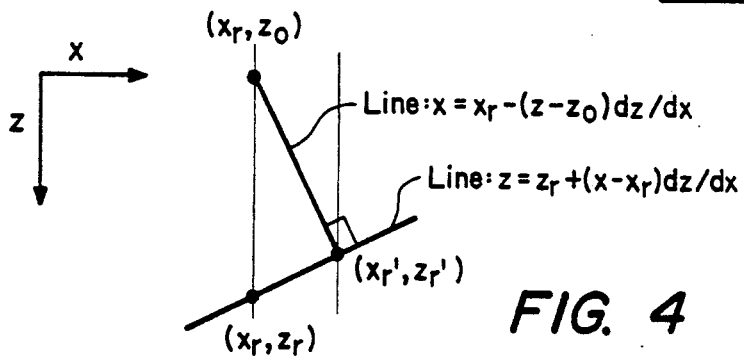
FIG. 4 is a graphical representation of the intercept of a migrated line and a perpendicular.
Figure 5:
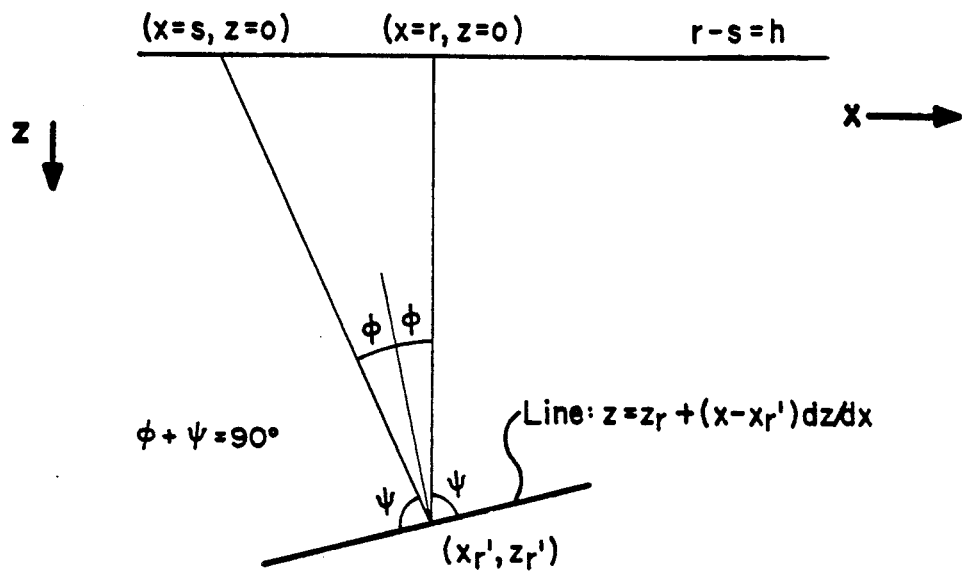
FIG. 5 is a graphical representation illustrating symmetrical rays reflecting at an estimated reflection point.

At block 32, for each line in the list, the point on the dipping migrated segment which lies closest to the zero offset image point is found. That is, the intercept of the migrated line $[z=z_r+(x-x_r)\cdot dz/dx]$ and a perpendicular line defined by the equation $[x=x_r-(z-z_0)\cdot dz/dx]$ which passes through the zero-offset point ($x_r$, $z_0$) is found. FIG. 4 is illustrative of the intersection of the migrated line and such a perpendicular. This revised point ($x_{r'}$, $z_{r'}$) will replace the neighboring reflection point ($x_r$, $z_r$). If the digitized reflectors are reasonably smooth (with little local curvature), then this revised point merely represents a valid data point to one side, a slight re-interpolation of the picks. It can now more accurately be assumed that if the migration velocity were corrected, then this revised reflection point would move to the zero offset position. The new list of data is i, $x_r$, $z_0$, $x_{r'}$, $z_{r'}$, dz/dx, h
i, $x_r$, $z_0$, $x_{r'}$, $z_{r'}$, dz/dx, h At block 34 source and receiver locations (s and r) are found on the surface for each reflection point by ray shooting. The surface positions should have the proper offset ($h=r-s$). The rays should reflect back at the estimated reflection point ($x_{r'}$, $z_{r'}$) symmetrically about the normal to the line segment defined by the equation $z=z_{r'}+(x-x_{r'})\cdot dz/dx$. FIG. 5 illustrates source and receiver locations found by this method.

At block 36 the surface positions and the total traveltime t of the up and down going rays are saved. Unnecessary parameters can be dropped from the list so that the list now contains the following parameters:

i, $x_r$, $z_0$, s, r, t
i, $x_r$, $z_0$, s, r, t ...

Figure 6:
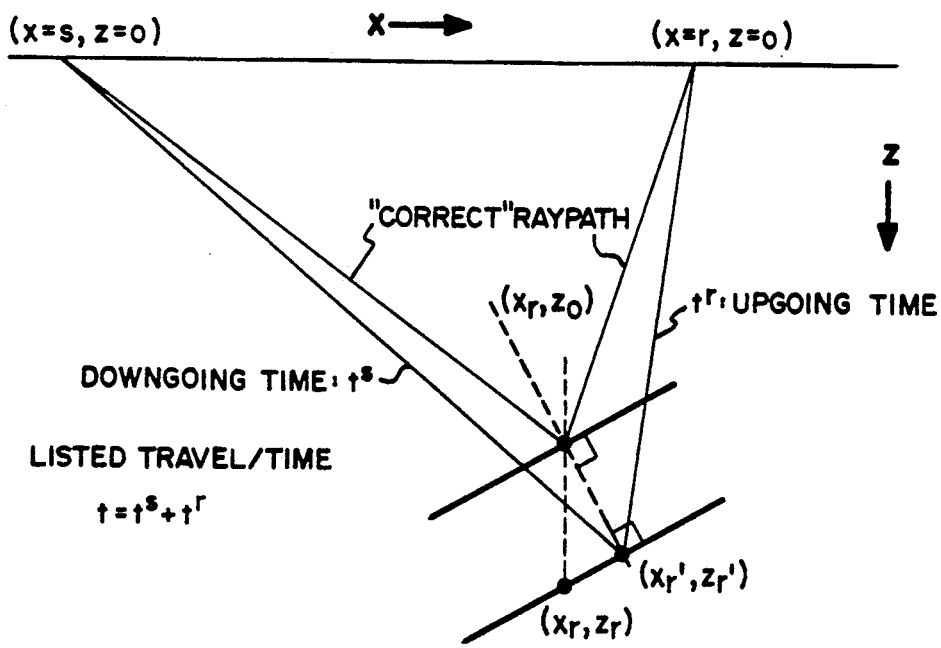
FIG. 6 is a graphical representation of locations of migrated reflection points.

At block 38 the listed travel times are made to correspond to unmigrated multi-offset traveltimes in the original data. This can be done because of the way the listed travel times were computed. These listed traveltimes are also consistent with the locations of migrated reflection points $(x_r, z_r)$. FIG. 6 is a graphical representation illustrating the consistency between the locations of the migrated reflection points and the listed travel times.

Assume, however, that a "correct" raypath passes from the source $(x=s, z=0)$ to the zero-offset reflection point $(x_r, z_0)$ and then up again to the receiver $(x=r, z=0)$. At block 40 the velocity model is improved so that traveltimes along "correct" raypaths best resemble the listed values. This may be done with conventional methods of traveltime tomography (iterative backprojection, etc.).

At block 42 a determination is made concerning the new and improved velocity model. The new model should explain multi-offset traveltimes with consistent zero offset reflection points. If the new model is not satisfactory, the program returns to block 16 where the process is repeated for improved results. If the new model is satisfactory, the program proceeds to block 44 where it ends. Convergence has been achieved when values of $z_r$ at different offsets approach common values of $z_0$.

The present invention provides a method of converting inconsistencies in reflector positioning from constant-offset migrations into equivalent errors in modeled traveltimes, so that conventional methods of traveltime tomography can improve the velocity model. An improved velocity model allows a more accurate migrated image of the subsurface. The estimated velocity model can also detect anomalous regions of geologic significance, such as low velocity gas accumulations and irregular near-surface weathering.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for tomographic estimation of seismic transmission velocities comprising the steps of:
   receiving seismic data;
   constructing an interval velocity model;
   migrating common offset gathers in depth and creating images of reflectors from each gather;
   digitizing segments of migrated constant-offset reflectors in depth z and over horizontal position x for a predetermined number of offsets;
   assigning an index during digitization to distinguish reflectors;
   calculating the dip dz/dx at each point;
   extrapolating zero offset depth for each point;
   assembling, for each reflection point, an output list comprising said indexes for each segment, said digitized segments, said dips and said offsets, wherein whenever the lines of said list share the same index, the lines are derived from different points along the same continuous reflector;
   determining for each line in said list, the point on the dipping migrated segment which lies closest to the zero offset image point;
   locating source and receiver positions on the surface for each reflection point;
   retaining the surface positions and the total traveltime t of the up and down going rays, whereby a list of traveltimes is retained;
   equating said listed traveltimes to unmigrated multi-offset traveltimes in the original data; and
   improving the velocity model so that traveltimes along "correct" raypaths, which includes raypaths from the source to the zero-offset reflection point and up to the receiver, best resemble the listed values.

2. The method according to claim 1 wherein said step of digitizing includes the steps of:
   determining whether the digitized reflection points provide an even and dense sampling over x; and
   re-interpolating the digitizing refection points to provide an even and dense sampling over x.

3. A method for tomographic estimation of seismic transmission velocities comprising the steps of:
   receiving seismic data;
   constructing an interval velocity model;
   migrating common offset gathers in depth and creating images of reflectors from each gather;
   digitizing segments of migrated constant-offset reflectors in depth z and over horizontal position x for a predetermined number of offsets;
   determining whether the digitized reflection points provide an even and dense sampling over x;
   re-interpolating the digitized reflection points to provide an even and dense sampling over x;
   assigning an index during digitization to distinguish reflectors;
   calculating the dip dz/dx at each point;
   extrapolating zero offset depth for each point;
   assembling, for each reflection point, an output list comprising said indexes for each segment, said digitized segments, said dips and said offsets, wherein whenever the lines of said list share the same index, the lines are derived from different points along the same continuous reflector;
   determining for each line in said list, the point on the dipping migrated segment which lies closest to the zero offset image point;
   locating source and receiver positions on the surface for each reflection point;
   retaining the surface positions and the total traveltime t of the up and down going rays, whereby a list of traveltimes is retained;
   equating said listed traveltimes to unmigrated multi-offset traveltimes in the original data; and
   improving the velocity model so that traveltime along "correct" raypaths, which includes raypaths from the source to the zero-offset reflection point and up to the receiver, best resemble the listed values.

4. An apparatus for tomographic estimation of seismic transmission velocities comprising:
   means for receiving seismic data;
   means for constructing an interval velocity model;
   means for migrating common offset gathers in depth;
   means for creating images of reflectors from each gather;
   means for digitizing segments of migrated constant-offset reflectors in depth z and over horizontal position x for a predetermined number of offsets;
   means for assigning an index during digitization to distinguish reflectors;
   means for calculating the dip dz/dx at each point;

means for extrapolating zero offset depth for each point;

means for assembling, for each reflection point, an output list comprising said indexes for each segment, said digitized segments, said dips and said offsets, wherein whenever the lines of said list share the same index, then the lines are derived from different points along the same continuous reflector;

means for determining for each line in said list, the point on the dipping migrated segment which lies closest to the zero offset image point;

means for locating source and receiver positions on the surface for each reflection point;

means for retaining the surface positions and the total traveltime t of the up and down going rays, whereby a list of traveltimes is retained;

means for equating said listed traveltimes to unmigrated multi-offset traveltimes in the original data; and means for improving the velocity model so that traveltimes along "correct" raypaths, which includes raypaths from the source to the zero-offset reflection point and up to the receiver, best resemble the listed values.

5. The apparatus according to claim 4 wherein said means for digitizing includes:

means for determining whether the digitized reflection points provide an even and dense sampling over x; and means for re-interpolating the digitized reflection points to provide an even and dense sampling over x.

* * * * *